United States Patent
Olson et al.

(10) Patent No.: US 12,469,220 B2
(45) Date of Patent: Nov. 11, 2025

(54) SHAPING NEURAL RADIANCE FIELD (NERF) GENERATION USING MULTIPLE POLYGONAL MESHES

(71) Applicant: Sony Interactive Entertainment LLC, San Mateo, CA (US)

(72) Inventors: Joseph Logan Olson, Glendale, CA (US); Nasir Mohammad Khalid, Montreal (CA)

(73) Assignee: Sony Interactive Entertainment LLC, San Mateo, CA (US)

(*) Notice: Subject to any disclaimer, the term of this patent is extended or adjusted under 35 U.S.C. 154(b) by 64 days.

(21) Appl. No.: 18/345,336

(22) Filed: Jun. 30, 2023

(65) Prior Publication Data
US 2025/0005859 A1    Jan. 2, 2025

(51) Int. Cl.
*G06T 17/20* (2006.01)
*G06T 13/40* (2011.01)
*G06T 15/08* (2011.01)

(52) U.S. Cl.
CPC .............. *G06T 17/20* (2013.01); *G06T 13/40* (2013.01); *G06T 15/08* (2013.01)

(58) Field of Classification Search
CPC ....... G06T 17/00; G06T 15/00; G06T 15/005; G06T 15/08; G06T 19/20
See application file for complete search history.

(56) References Cited

U.S. PATENT DOCUMENTS

| | | | |
|---|---|---|---|
| 2020/0210540 A1* | 7/2020 | Bala | A45D 44/002 |
| 2022/0245510 A1 | 8/2022 | Abhinav et al. | |
| 2023/0051409 A1 | 2/2023 | Du et al. | |
| 2023/0401837 A1* | 12/2023 | Yan | G06T 15/06 |
| 2025/0005860 A1 | 1/2025 | Olson et al. | |
| 2025/0005863 A1 | 1/2025 | Olson et al. | |

FOREIGN PATENT DOCUMENTS

| | | |
|---|---|---|
| CN | 114119838 A | 3/2022 |
| CN | 115100339 B | 6/2023 |
| WO | 2022198686 A1 | 9/2022 |
| WO | WO 2024241064 A1 | 11/2024 |

OTHER PUBLICATIONS

Metzer, Gal, et al. "Latent-NeRF for Shape-Guided Generation of 3D Shapes and Textures." arXiv e-prints (2022): arXiv-2211. (Year: 2022).*

Poole et al., "DreamFusion: Text-to-3D using 2D Diffusion", arXiv, Sep. 29, 2022.

Vachha, "Creating VFX with NeRFs—Nerfstudio Blender Add-On Tutorial", YouTube, Apr. 3, 2023.

(Continued)

*Primary Examiner* — Ryan McCulley
(74) *Attorney, Agent, or Firm* — Fish & Richardson P.C.

(57) ABSTRACT

A neural radiance field (NeRF) for rendering an image in response to a text description receiving a text description is generated by using first and second polygonal meshes to establish spatial constraints. Points of the NeRF are scored using the spatial constraints to modify the NeRF, which may then be used, typically after conversion to a mesh, in rendering a computer simulation character or object.

10 Claims, 10 Drawing Sheets

(56) References Cited

OTHER PUBLICATIONS

Yuan et al., "NeRF-Editing: Geometry Editing of Neural Radiance Fields", arXiv, May 10, 2022.
Zhuang et al., "DreamEditor: Text-Driven 3D Scene Editing with Neural Fields", arXIV, Jun. 23, 2023.
"International Search Report and Written Opinion", dated Aug. 20, 2024, from the counterpart PCT application PCT/US24/032616.
Besl et al., "A Method for registration of 3-D shapes," Proc. SPIE 1611, Sensor Fusion IV: Control Paradigms and Data Structures, Apr. 30, 1992, pp. 586-606.
Chen et al., "MobileneRF: Exploiting the polygon rasterization pipeline for efficient neural field rendering on mobile architectures." CoRR, Submitted on May 30, 2023, arXiv:2208.00277v5, 16 pages.
Deng et al., "Depth-supervised nerf: Fewer views and faster training for free," CoRR, Submitted on Apr. 29, 2022, arXiv:2107.02791v2, 13 pages.
Jain et al., "Zero-shot text-guided object generation with dream fields," CoRR, Submitted on May 4, 2022, arXiv:2112.01455v2, 14 pages.
Jiang et al., "Computational Design and Optimization of Quad Meshes Based on Diagonal Meshes," Computational Design and Optimization of Quad Meshes Based on Diagonal Meshes, Advances in Architectural Geometry 2020 (AAG2020), 2020, 21 pages.
Li et al., "Neuralangelo: High-Fidelity Neural Surface Reconstruction," CoRR, Submitted on Jun. 12, 2023, .or arXiv:2306.03092v2, 18 pages.
Lin et al., "CompoNeRF: Text-guided multi-object compositional NeRF with editable 3d scene layout," Mar. 24, 2023, arXiv:2303.13843v1, 10 pages.
Lin et al., "Magic3D: High-Resolution Text-to-3D Content Creation," CoRR, Submitted on Mar. 25, 2023, 18 pages.
Liu et al., "ISS: Image as stepping stone for text-guided 3D shape generation," CoRR, Submitted on Feb. 24, 2023, arXiv:2209.04145v6, 27 pages.
Sanghi et al., "CLIP-Forge: Towards Zero-Shot Text-to-Shape Generation," CoRR, Submitted on Oct. 6, 2021, arXiv:2110.02624v1, 6 pages.
Wang et al., "Neural fields meet explicit geometric representations for inverse rendering of urban scenes," CoRR, Submitted on Apr. 6, 2023, arXiv:2304.03266v1, 16 pages.
Xu et al., "Point-NeRF: Point-based Neural Radiance Fields," CoRR, Submitted on Mar. 15, 2023, arXiv:2201.08845v7, 17 pages.
Zhang et al., "Text2nerf: Text-driven 3d scene generation with neural radiance fields," CoRR, Submitted on May 19, 2023, arXiv:2305.11588v1, 13 pages.
International Search Report and Written Opinion in International Appln. No. PCT/US2024/032616, mailed on Aug. 20, 2024, 18 pages.
Poole et al., "DreamFusion: Text-to-3D using 2D Diffusion," CoRR, Submitted on Sep. 29, 2022, arXiv:2209.14988v1, 18 pages.
Vachha, "Creating VFX with NeRFs—Nerfsudio Blender Add-On Tutorial," YouTube, Apr. 3, 2023, retrieved on Jul. 14, 2025, retrieved from URL<https://www.youtube.com/watch?v=vDhj6j7kfWM>, 11 pages with machine transcript.
Yuan et al., "NeRF-Editing: Geometry Editing of Neural Radiance Fields," CoRR, Submitted on May 10, 2022, arXiv:2205.04978v1, 12 pages.

* cited by examiner

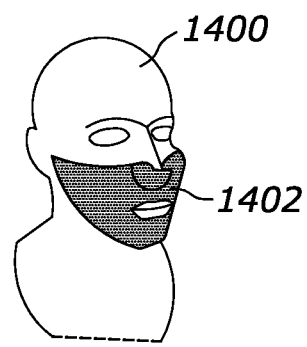
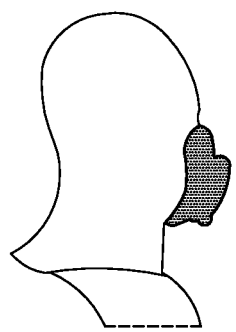
FIG. 14   FIG. 15
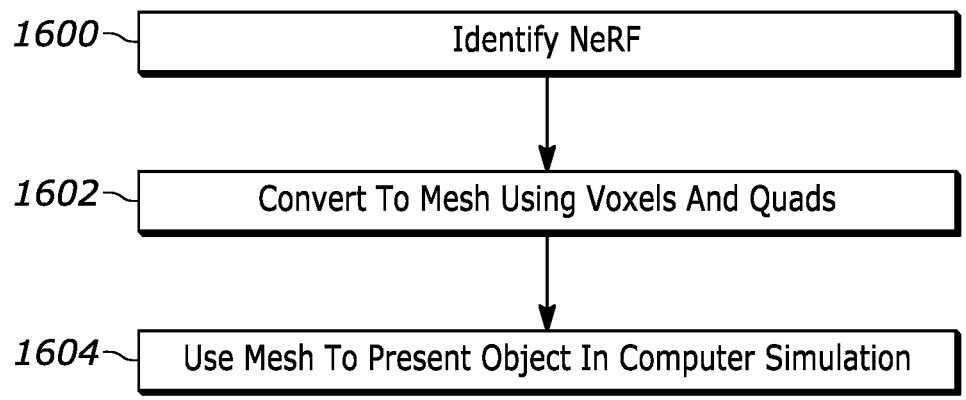
FIG. 16

SHAPING NEURAL RADIANCE FIELD (NERF) GENERATION USING MULTIPLE POLYGONAL MESHES

FIELD

The present application relates generally to the shaping of Neural Radiance Field (NeRF) generation using multiple polygonal meshes.

BACKGROUND

A 3D neural radiance field (NeRF) may be thought of as a 3D volume stored in a machine learning (ML) model. As understood herein, the ML model can be trained to receive text descriptions of a desired object and in response produce images of objects such as characters and their accoutrements for computer simulations such as computer games. Once a NeRF has been produced it must typically be converted to a mesh for use in computer simulations.

As further understood herein, there are at present less than optimum solutions for rendering NeRFs for computer simulations and/or for transforming a NeRF to a mesh.

SUMMARY

Accordingly, a method includes receiving a text description. The method also includes generating a neural radiance field (NeRF) based on the text description at least in part by using at least first and second polygonal meshes to establish spatial constraints, scoring plural points of the NeRF using the spatial constraints to modify the NeRF, and using the NeRF to establish at least one mesh for use in rendering a computer simulation character or object.

In examples, the spatial constraint may includes one or more of covering a specific part of a head of the character, not being within a head of the character having holes for eyes and neck of the character, matching a proportion relative to the character, and not overlapping portion of a body of the character below the head of the character during animation of the character in the computer simulation.

In some examples the first and second polygonal meshes establish respective hollow containers.

In example implementations a first point of the plural points is associated with the first transparency and a second point of the plural points is associated with a second transparency, with each of the plural points being associated with a transparency. Also, in example implementations the first polygonal mesh may establish a first zone and the second polygonal mesh may establish a second zone containing the first zone, and a first point of the plural points is given a positive score responsive to the first point being inside the first zone and a negative score responsive to the point being outside the second zone. Moreover, the score given to a point may vary according to a transparency of the point and a distance of the point from at least one of the polygonal meshes.

In another aspect, a processor assembly is configured to execute one or more of A, B, C. A includes generating at least one neural radiance field (NeRF) using at least first second polygonal meshes. B includes using polygon mesh render composites for generating a NeRF. C includes comprises using voxels and quad polygons for converting a NeRF to at least one mesh for use of the mesh in rendering a computer simulation character or object.

In another aspect, a computer memory that is not a transitory signal includes instructions executable by at least one processor assembly for initializing a neural radiance field (NeRF) as a random blob. The instructions are executable for rendering a normal image of the NeRF. Further, the instructions are executable for computing a score distillation sampling (SDS) loss/gradient for the normal image and computing a shape loss/gradient for the normal image, and then updating parameters of the NeRF based at least in art on the SDS gradient and shape gradient. The instructions also are executable for converting the NeRF to a quad mesh using voxels for use of the quad mesh in rendering at least one object in at least one computer simulation.

The details of the present application, both as to its structure and operation, can be best understood in reference to the accompanying drawings, in which like reference numerals refer to like parts, and in which:

BRIEF DESCRIPTION OF THE DRAWINGS

FIG. 14 illustrates a third image of a composite of a 3D model and a NeRF consistent with FIG. 11;

FIG. 15 illustrates a fourth image of a composite of a 3D model and a NeRF consistent with FIG. 11;

FIG. 16 illustrates example logic in example flow chart format for implementing a third one of the techniques shown in FIG. 2;

DETAILED DESCRIPTION

Figure 1:
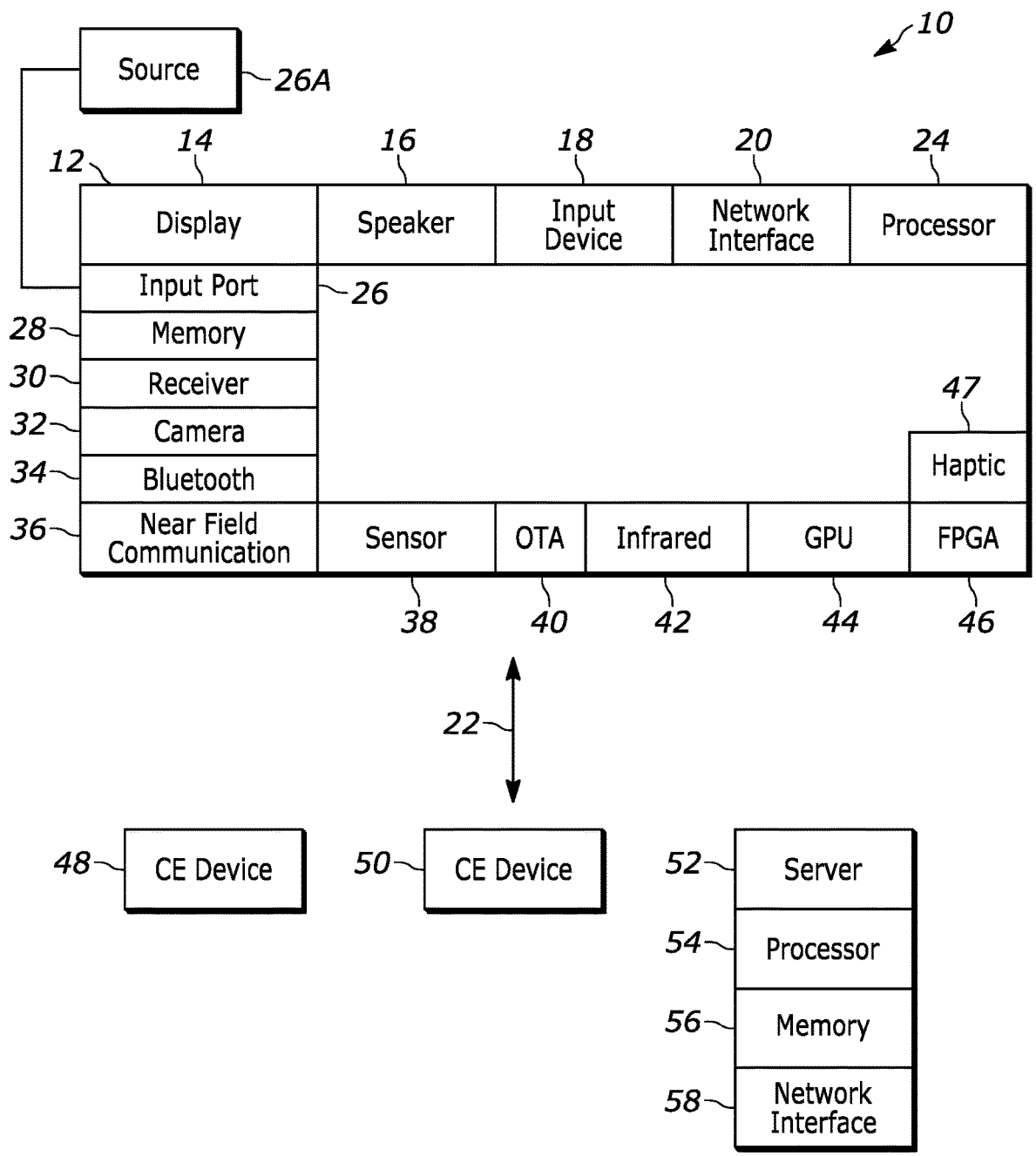
FIG. 1 is a block diagram of an example system in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry. A processor assembly may include one or more processors.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Generative pre-trained transformers (GPTT) also may be used. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that are configured and weighted to make inferences about an appropriate output.

Figure 2:
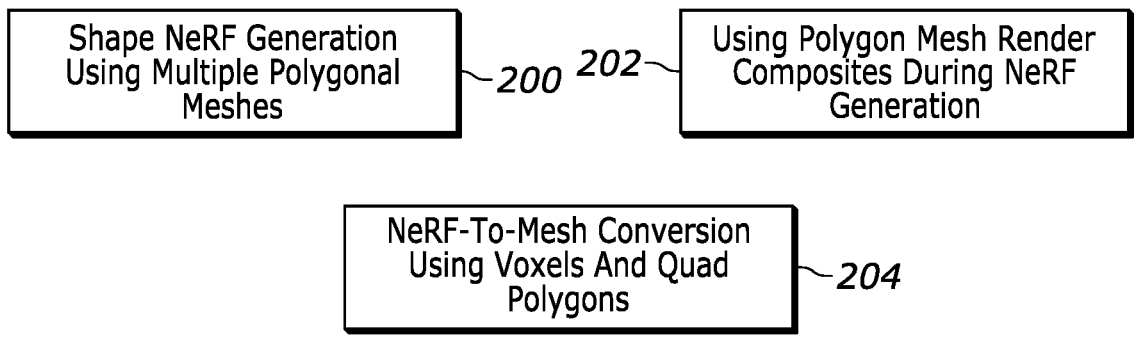
FIG. 2 illustrates overall interrelated techniques consistent with present principles.

FIG. 2 illustrates that present principles, in certain embodiments, provide one or more techniques that may be used independently of each other to render computer simulation objects such as computer game characters or in conjunction with each other. As indicated at block 200, NeRF generation can be shaped or otherwise executed using multiple polygonal meshes, which may be thought of as mesh containers that are useful for positive/negative scoring of NeRF points. Also, as indicated at block 202, polygon mesh render composites can be used during NeRF generation, e.g., to generate an initial NeRF for use in the technique of block 200. Furthermore, as indicated at block 204, a NeRF-to-mesh technique is disclosed using voxels and quad polygons instead of marching cubes to generate a mesh from a NeRF, e.g., the NeRF produced by the technique of block 200.

Figure 3:
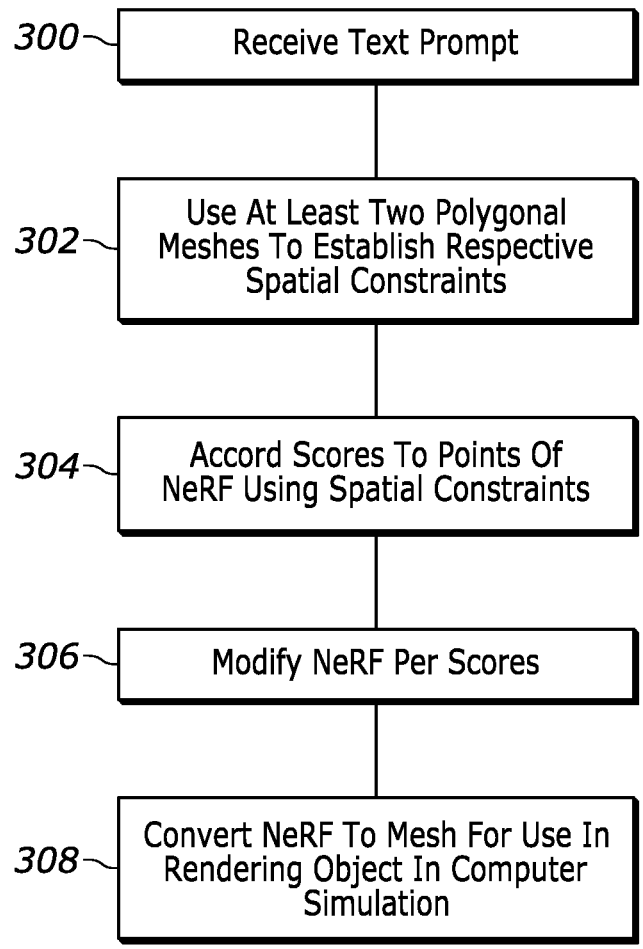
FIG. 3 illustrates example logic in example flow chart format for implementing a first one of the techniques shown in FIG. 2.

Turn now to FIG. 3 for further understanding of the NeRF generation technique of block 200. A text prompt (e.g., from a spoken prompt or from keyboard entry or other entry technique) is received at block 300. The text prompt may describe a desired object to be rendered, such as a particular type of head for a computer game character. In response to the prompt, a NeRF version of the demanded object is produced.

This is illustrated further at block 302, in which at least two polygonal meshes are used to define spatial constraints that the output of the NeRF must satisfy. For instance, a mask on a character's head should cover a specific part of the head, should not intrude into the head, should have holes for the eyes and neck of the character, should be the correct proportion relative to the character, and should not violate (intrude into or impede) the shoulders/body of the character when the character moves around.

Figure 8:
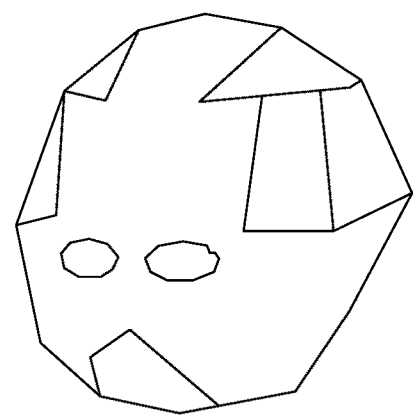
Figure 9:
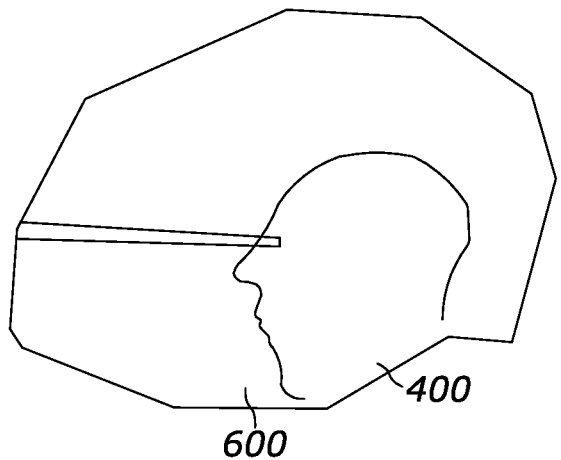
FIG. 9 illustrates the first polygonal mesh fitting inside the second polygonal mesh.
Figure 10:
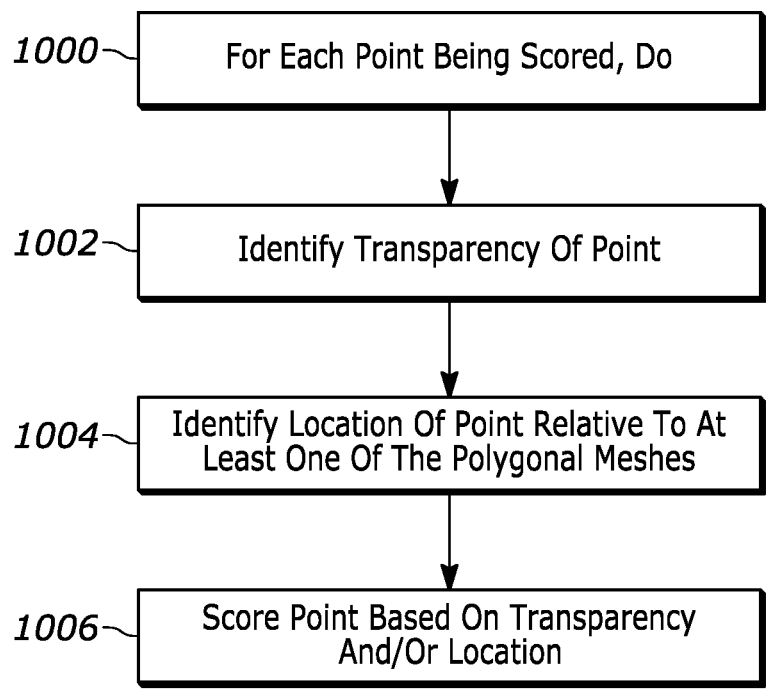
FIG. 10 illustrates additional example logic in example flow chart format consistent with FIG. 3.

In the example shown in FIGS. 3-10, two polygonal meshes are used, which may be thought of, respectively, as a good zone mesh and a safe zone mesh that encompasses the good zone mesh, both of which may be thought of as hollow containers. Note that NeRFs are made from points that may have variable transparency. Accordingly, proceeding to block 304, for at least some and preferably all points of an initial NeRF, the point is accorded a score according to the spatial constraints. For example, if the point is within the first polygonal mesh (i.e., the smaller "good" zone"), a positive score is accorded to the point. On the other hand, if a point is outside the second polygonal mesh (i.e., the larger "safe zone"), it is accorded a negative score. Points between the two zones are not accorded any points. FIG. 10 described further below provides additional discussion on how the magnitudes of the positive and negative scores may be determined.

Proceeding to block 306, the NeRF is modified by the underlying ML model receiving to the scores, e.g., by eliminating points (by, e.g., designating them as fully transparent) with negative scores satisfying a threshold and retaining or emphasizing points with positive scores satisfying a threshold. The process of blocks 304 and 306 may be iteratively repeated until a final NeRF is output at block 308 for conversion to a mesh that can be used to render an object such as a computer game character.

Figure 4:
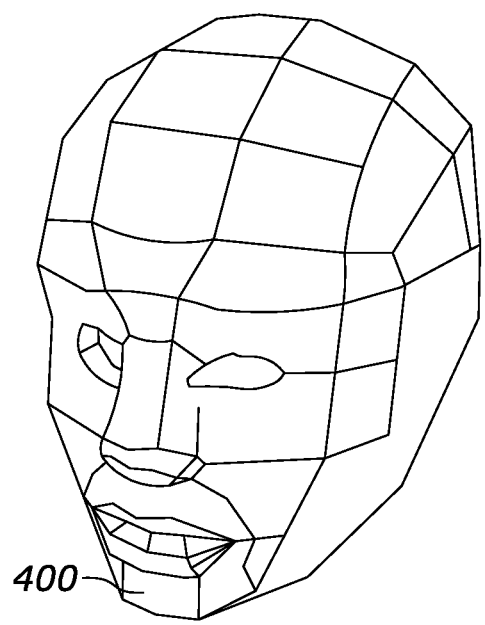
FIG. 4 illustrates a first polygonal mesh consistent with the logic of FIG. 3.
Figure 5:
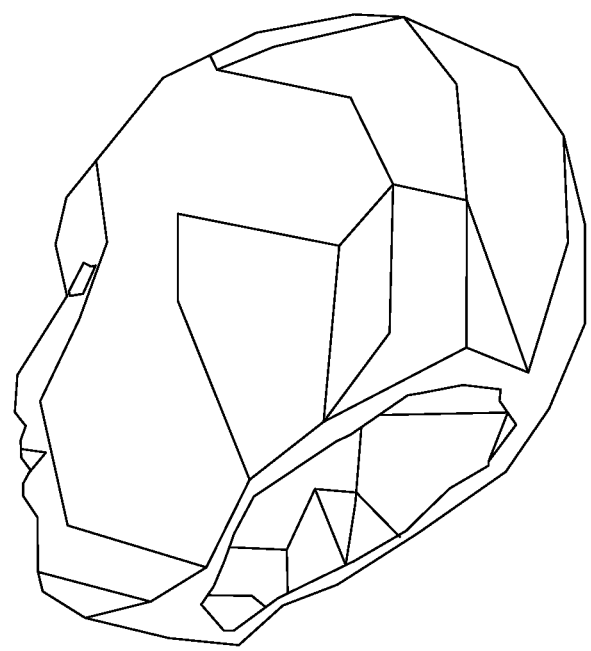
FIG. 5 illustrates the first polygonal mesh from another perspective.

FIGS. 4-9 provide illustrations of the process shown in FIG. 3. In FIGS. 4 and 5, a first polygonal mesh 400 (the "good zone" mesh in the example above) is shown from anterior and posterior perspectives, respectively. The mesh 400 encourages a mask for a computer game character that fully envelopes the head, leaving holes as shown for certain features such as the eyes and neck.

Figure 6:
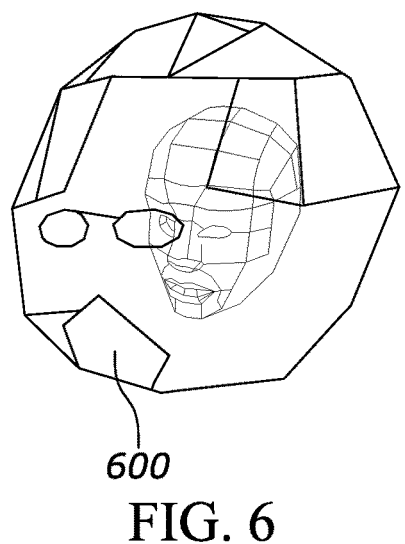
FIG. 6 illustrates a second polygonal mesh consistent with the logic of FIG. 3.
Figure 7:
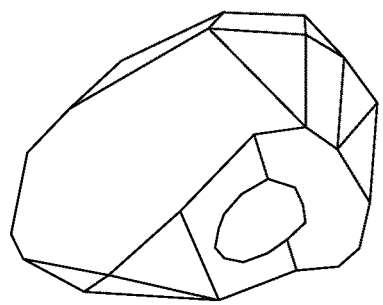
FIGS. 7 and 8 illustrate the second polygonal mesh from different perspectives.

In FIGS. 6-8, a second polygonal mesh 600 is shown from frontal perspectives (FIGS. 6 and 8) and an inferior perspective (FIG. 7). As shown, the second polygonal mesh includes holes for certain features such as the eyes and neck and permits points of the NeRF to exist within the second mesh so long as the points are not located in the eyes and do not intrude into the head.

FIG. 9 illustrates the size relationship between the two polygonal meshes, in which the first polygonal mesh 400 is completely encompassed by the second polygonal mesh 600. In this way, the spatial constraints of one mesh do not conflict those of the other mesh.

FIG. 10 illustrates that the magnitude of positive and negative scores accorded to a point may depend on the transparency of the point and/or distance of the point from a reference. Commencing at block 1000, for each point that has been scored, the logic moves to block 1002 to identify the transparency of the point. The logic alternately or additionally may move to block 1004 to identify one or more distances of the point to one or more respective references. For example, the distance of the point from the nearest surface of the first polygonal mesh and the distance of the point from the nearest distance of the second polygonal mesh may be identified.

The magnitude of the score of the point is established at block 1006 based on the transparency and/or distance(s) identified in blocks 1002 and 1004. For example, a more solid (less transparent) point may be accorded a higher magnitude score than a less solid (more transparent) point. With respect to distance for example, the further outside the second mesh a point is, the higher the magnitude of the negative score accorded to that point.

Below is an example algorithm implementing the technique of FIGS. 3-10, in which "zone 1" refers to the first polygonal mesh and "zone 2" refers to the second polygonal mesh.

```
in_zone(1)= points.in.mesh (self.verts_zone(1), self.faces_zone(1), points) >.5
in_zone(2)= points.in.mesh (self.verts_zone(2), self.faces_zone(2), points) >.5
full_weight_space = torch.logical_or( in zone(2), torchlogical_not(in zone(1))
dist_zone(2) = get_distance(self.verts_zone(2), self.faces_zone(2), points)
dist_zone(1) = get_distance(self.verts_zone(1), self.faces_zone(1), points)
t= )dist_zone(2)/(dist_zone(2)+dist_zone(1)).squeeze(0)
t=torch.exp(-(t/(2*self.cfg.proximal_surface**2))).clamp(0.,1.)
weight=torch.where(full_weight_space, 1.,t)
mesh_occupancy=in_zone(1).float( )
nerf_occupancy = 1 - torch.exp(-DELTA * sigmas)
```

```
nerf.occupancy = nerf.occupancy.clamp(min=0, max=1.)
weight=weight.squeeze(0)
#changes from sum to mean and cranked up default lambda_shape LR
loss=F.binary_cross_entropy_with_logits(nerf_occupancy,
mesh_occupancy,weight=weight)
  return loss
```

Turn now to FIGS. 11-15 for further understanding of the technique illustrated in block 202 of FIG. 2. Beginning at block 1100, a preexisting 3D model of an object, e.g., a head of a computer game character, is rendered along with its depth map using plural camera settings. Also, at block 1102 an initial NeRF is rendered with its depth map using the same camera settings used at block 1100 to render the 3D model.

Block 1104 indicates that the depth maps from blocks 1100 and 1102 are used to composite the 3D model and NeRF together, which is then used to train a text-to-3D machine learning (ML) model at block 1106. This allows the text-to-3D ML model to "judge" a more complete picture. The trained ML model may then be used at block 1108 to output a NeRF in response to receiving a text description.

There are some shapes that only make sense in context. For instance, in an example text-to-3D setup, "n95 mask" will also generate a human head for the mask to wear. To solve this, and to generate shapes that complement the human head, the NeRF render is composited with a 3D render taken at the same angle (as an example of a camera setting).

Figure 11:
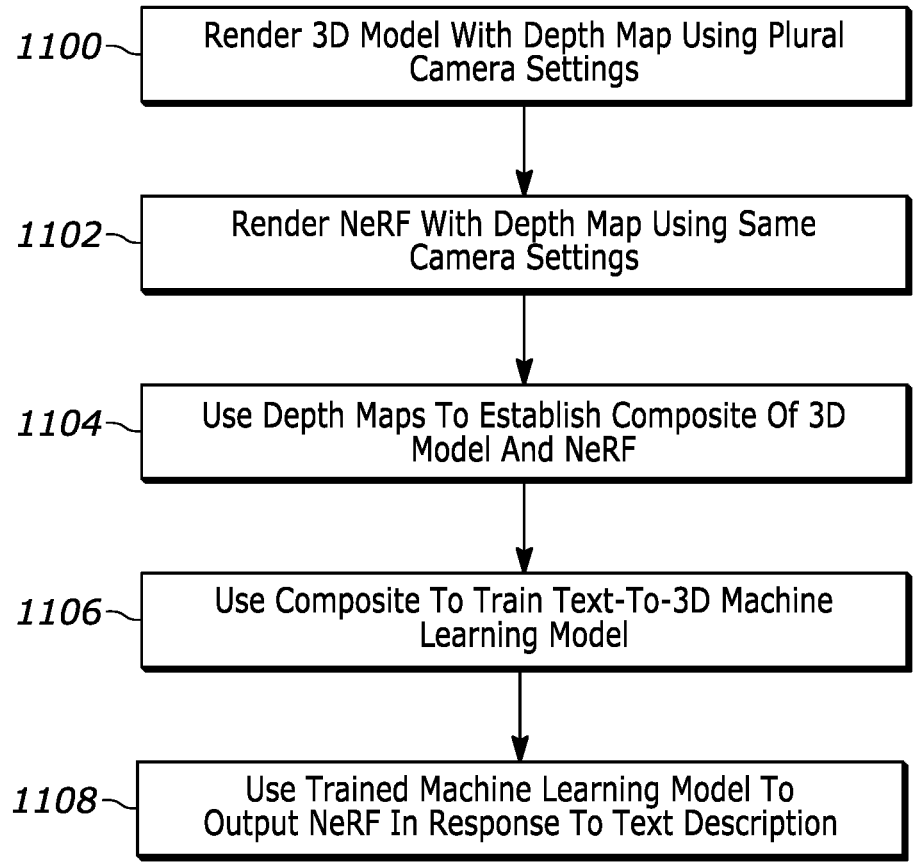
FIG. 11 illustrates example logic in example flow chart format for implementing a second one of the techniques shown in FIG. 2.
Figures 12, 13:
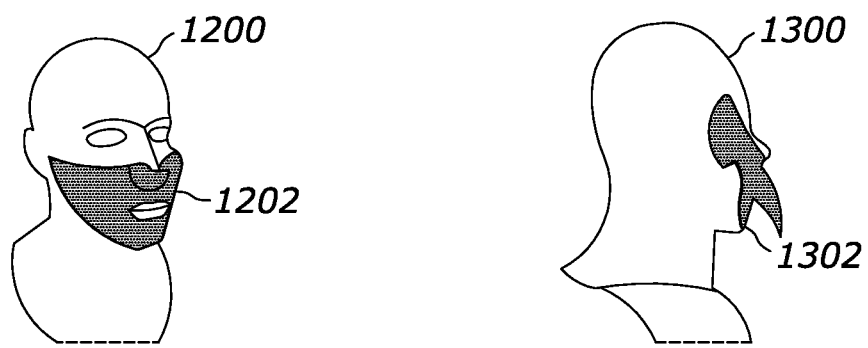
FIG. 12 illustrates a first image of a composite of a 3D model and a NeRF consistent with FIG. 11.
FIG. 13 illustrates a second image of a composite of a 3D model and a NeRF consistent with FIG. 11.

FIG. 12 illustrates a character head 1200 generated along with at least part of a mask 1202 according to the technique of FIG. 11. FIG. 13 illustrates another character head 1300 along with a mask 1302. Similarly, FIG. 14 illustrates a head 1400 with at least part of a mask 1402 and FIG. 15 illustrates, from a posterior perspective, yet another head and mask.

FIGS. 16-21 provide details of the technique shown at block 204 in FIG. 2. Note that in 3D computer graphics, a voxel, which does not have a coordinate explicitly encoded but which is positioned in space based on its relative position to other voxels, represents a value on a regular grid in three-dimensional space. Note further that polygons such as the four-sided polygons referred to herein as "quads" are represented by the coordinates of their vertices. When quads are used, instead of triangles, "squares" are used for each facet of the mesh. Note that a quad may be a pair of triangles joined along a common edge to form a square. Note further that the technique described below can be used at different "resolutions" of voxel mesh depending on how detailed/ "smooth" the final mesh output is desired to be.

Commencing at block 1600, a NeRF to be converted to a mesh is identified. The NeRF is a voxelized version of a NeRF. Proceeding to block 1602, the NeRF is converted to a mesh using voxels and four-sided polygons referred to herein as "quads" so that the mesh may be used at block 1604 to present an object such as a character in a computer simulation.

Figure 17:
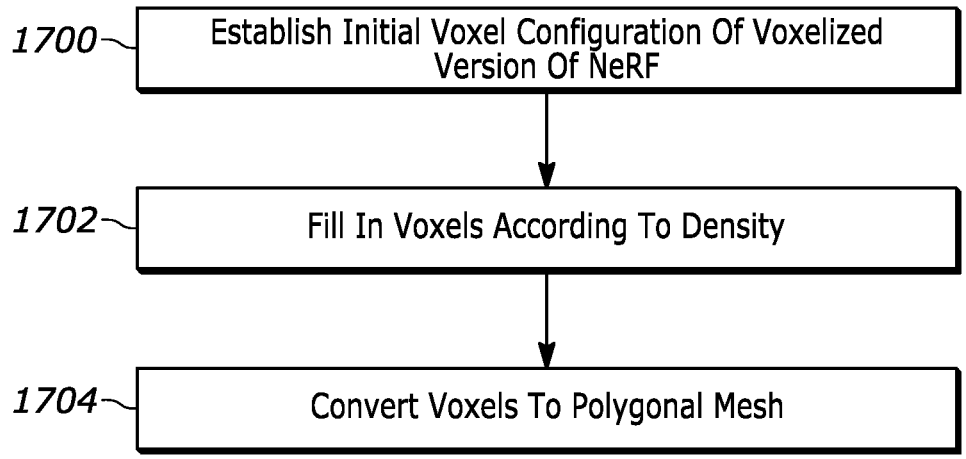
FIG. 17 illustrates further example logic in example flow chart format for implementing the third one of the techniques shown in FIG. 2.

Block 1700 of FIG. 17 provides further details of generating the initial voxel configuration in FIG. 16. Moving to block 1702, a 3D grid is formed and each cell examined for voxel points. If there are enough visible points (sufficiently high "density"), the voxel is filled in. The voxels are then turned into a single polygon mesh at block 1704.

Figure 18:
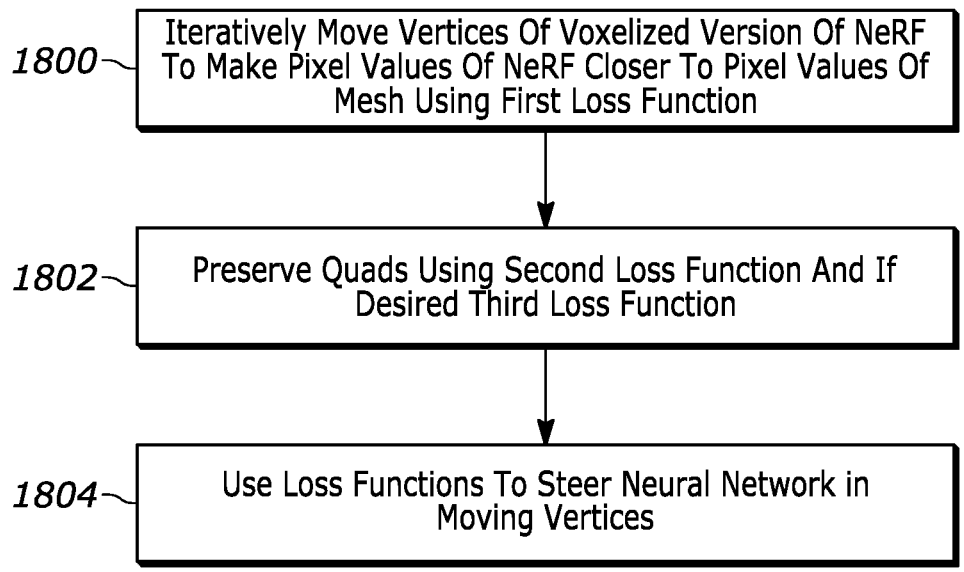
FIG. 18 illustrates further example logic in example flow chart format for implementing the third one of the techniques shown in FIG. 2.

FIG. 18 provides further details of the process at block 1602 in FIG. 16. At block 1800 in FIG. 18, the vertices of the voxelized version of the NeRF are moved around using a first loss function, which in one embodiment may include mean squared error (MSE) optimization. This technique basically compares the render of the NeRF and mesh and moves vertices to make their pixel values as similar as possible.

To restate the above, the positions of the vertices of the voxelized NeRF are modified by a neural network. The neural network is optimized using the first loss function and gradient descent (via backpropagation). In this example, the NeRF and mesh are rendered using the same random camera angles and then the RGB values of the two images are compared using, as an example, MSE loss.

Block 1802 indicates that in addition to moving the vertices of the voxelized NeRF, quads are preserved using one or more additional loss functions. In an example, two quad-specific loss functions may be used. First, normals of each triangle pair that makes up a quad are calculated and a penalty assessed if the normal are not parallel to each other using the dot product illustrated in FIGS. 19-21 and described further below. Additionally, any variance in the length of the edges of a quad is penalized, to reflect the desire to maintain square quads.

If desired, non-quad basic regularization loss may be performed. For example, a penalty may be assessed if the faces (as in each quad) vary in size. Also, basic Laplacian loss may be performed to smooth the mesh and look at the delta.

Proceeding to block 1804, one or more of the above losses, e.g., the MSE loss, the quad preserving loss, and the regularization loss are used to steer a neural network that determines the offset of each vertex from its original position. Below is an example neural network for implementing the above technique. It has a basic positional encoder, fully connected linear layers, and then a tanh function that smooshes the range down to +/-1 (so the vertices can't go too far away from original position).

```
Class VertexMode(nn.module);
  def __init__(self, symmetry, vertex_range)
    super( ).__init__( )
    num_layers=3
    hidden_dim=64
```

-continued

```
    self.vertex_range=vertex.range
    self.tanh=nn.Tanh( )
    self.encoder, self.in_dim=get_encoder('tlledgrid', input_dim=3,
desired_resolution=2048, symmetry=symmetry)
    self.net=MLP(dim_in=self.in.dim, dim_out=3, dim_hidden=hidden_dim,
num_laters=num_layers, bias=False)
  def forward(self, P)
    h=self.encoder(p)
    h=self.net(h)
    h=self.tanh(h) * self.vertex_range
```

Figure 19:
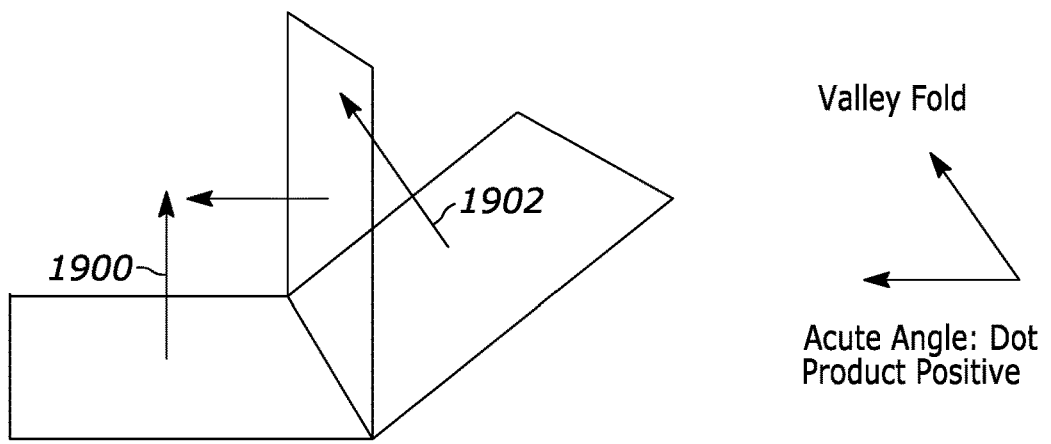
FIG. 19 presents a first conceptual illustration of dot product principles consistent with FIGS. 16-18.
Figure 20:
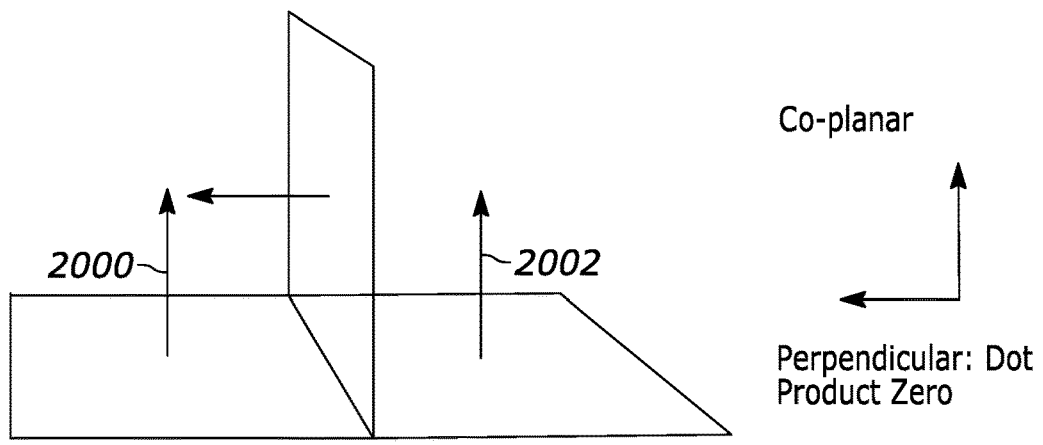
FIG. 20 presents a second conceptual illustration of dot product principles consistent with FIGS. 16-18.
Figure 21:
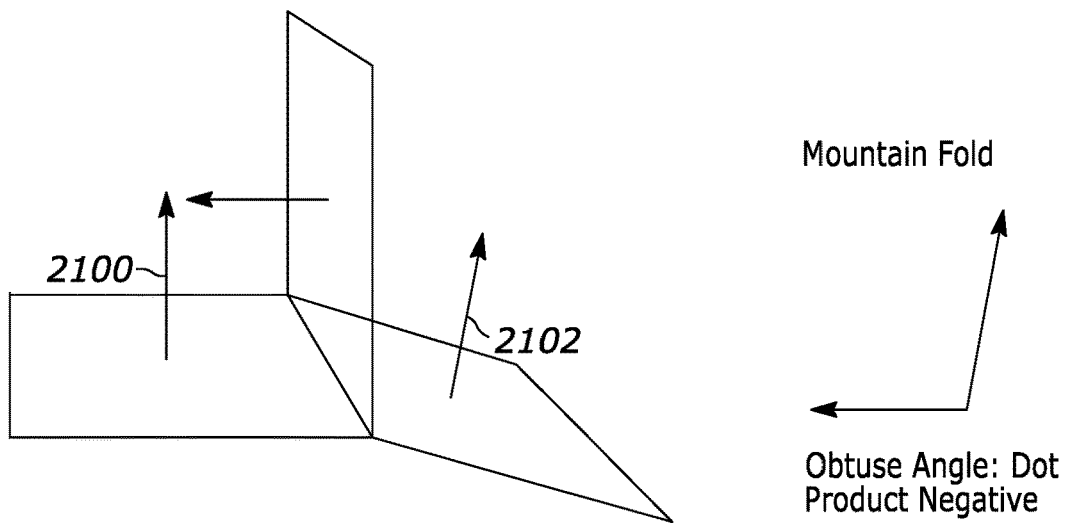
FIG. 21 presents a third conceptual illustration of dot product principles consistent with FIGS. 16-18.

FIG. 19 illustrates a geometry in which the dot product between two normals 1900, 1902 is positive. In contrast, FIG. 20 illustrates a geometry in which the dot product between two normals 2000, 2002 is zero. Yet again, FIG. 21 illustrates a geometry in which the dot product between two normals 2100, 2102 is negative.

Figure 22:
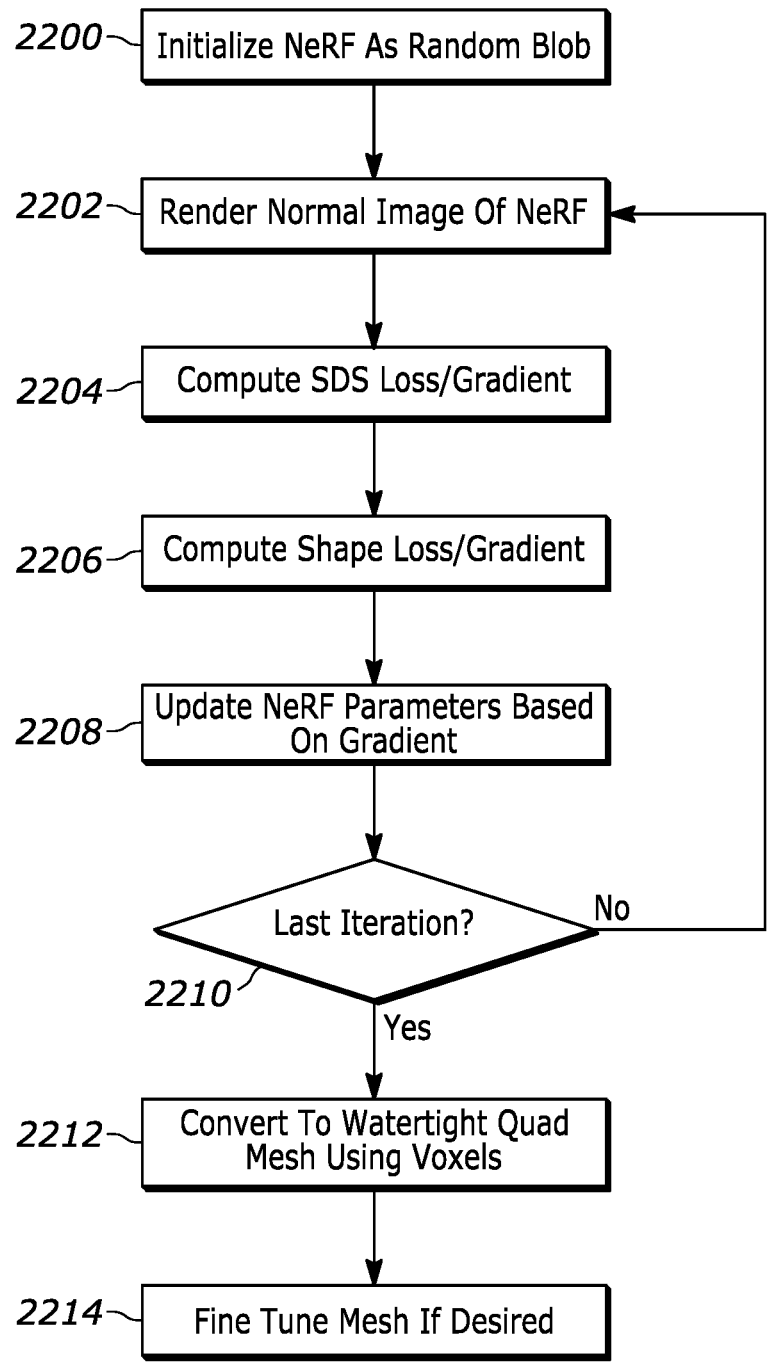
FIG. 22 illustrates example logic in example flow chart format consistent with the techniques described herein.

Refer now to FIG. 22 which illustrates an implementation of the principles discussed above using all three techniques of FIG. 2 and related figures. Commencing at block 2200, a NeRF is initialized as a random blob.

At block 2202, an iterative loop is entered in which a normal image of the NeRF can be rendered. Proceeding to block 2204, a score distillation sampling (SDS) loss/gradient is computed for the normal image of the NeRF. SDS is a machine learning technique to turn a NeRF into a shape through a text prompt. The SDS loss is what turns the blob into a mask.

In parallel with computing the SDS loss/gradient, at block 2206 a shape loss/gradient is also computed, and the NeRF parameters are updated based on the gradients at block 2208.

State 2210 indicates that if the last iteration has not been arrived at, the logic loops back to block 2202. Otherwise, when the last iteration (e.g., the two thousandth) has been executed, the logic moves to block 2212 to convert the final version of the NeRF to a watertight quad mesh using voxels as described above. Block 2214 indicates that the mesh may be fine-tuned if desired.

While the particular embodiments are herein shown and described in detail, it is to be understood that the subject matter which is encompassed by the present invention is limited only by the claims.

What is claimed is:

1. A method comprising:
  receiving a text description;
  generating a neural radiance field (NeRF) based on the text description at least in part by:
    using at least first and second polygonal meshes to establish spatial constraints;
    scoring plural points of the NeRF using the spatial constraints to modify the NeRF; and
    using the NeRF to establish at least one mesh for use in rendering a computer simulation character or object, wherein the first polygonal mesh establishes a first zone and the second polygonal mesh establishes a second zone containing the first zone, and a first point of the plural points is given a positive score responsive to the first point being inside the first zone and a negative score responsive to the point being outside the second zone.

2. The method of claim 1, wherein at least one spatial constraint comprises not being within a head of the simulation character and/or having holes for eyes and neck of the simulation character.

3. The method of claim 2, wherein at least one spatial constraint comprises covering a specific part of a head of the character.

4. The method of claim 2, wherein at least one spatial constraint comprises not being within a head of the character.

5. The method of claim 2, wherein at least one spatial constraint comprises having holes for eyes and neck of the character.

6. The method of claim 2, wherein at least one spatial constraint comprises matching a proportion relative to the character.

7. The method of claim 2, wherein at least one spatial constraint comprises not overlapping portion of a body of the character below a head of the character during animation of the character in the computer simulation.

8. The method of claim 1, wherein the first and second polygonal meshes establish respective hollow containers.

9. The method of claim 1, wherein a first point of the plural points is associated with a first transparency and a second point of the plural points is associated with a second transparency, each of the plural points being associated with a transparency.

10. The method of claim 1, wherein the score given to a point varies according to a transparency of the point and a distance of the point from at least one of the polygonal meshes.

* * * * *